(12) United States Patent
Ramasamy et al.

(10) Patent No.: US 11,138,317 B2
(45) Date of Patent: Oct. 5, 2021

(54) SYSTEM AND METHOD FOR LOCATING AND CORRECTING VULNERABILITIES IN A TARGET COMPUTER SYSTEM

(71) Applicant: Accenture Global Solutions Limited, Dublin (IE)

(72) Inventors: Manoharan Ramasamy, Bangalore (IN); Jayant Swamy, Bangalore (IN); Nitin Madhukar Sawant, Mumbai (IN); Balaji Muthukumaran, Bangalore (IN); Rakesh Singh Kanyal, Gurgaon (IN); Anil G Kum, Pune (IN); Jyoti Hotte, Pune (IN); Harshal Kumar, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 210 days.

(21) Appl. No.: 16/030,023

(22) Filed: Jul. 9, 2018

(65) Prior Publication Data

US 2019/0018967 A1    Jan. 17, 2019

(30) Foreign Application Priority Data

Jul. 14, 2017   (IN) .............................. 201741025111

(51) Int. Cl.
*G06F 21/57* (2013.01)
*G06F 8/71* (2018.01)

(52) U.S. Cl.
CPC .............. *G06F 21/577* (2013.01); *G06F 8/71* (2013.01); *G06F 2221/033* (2013.01)

(58) Field of Classification Search
None
See application file for complete search history.

(56) References Cited

U.S. PATENT DOCUMENTS 7,284,274 B1    10/2007   Walls et al.
2005/0257086 A1*  11/2005   Triou, Jr. ............ G06F 11/3688
                                              714/25

(Continued)

OTHER PUBLICATIONS

Shin et al., An Empirical Model to Predict Seuciryt Vulnerabilities using Code Complexity Metrics, ESEM'08, 2008, 315-317 (Year: 2008).*

(Continued)

*Primary Examiner* — Luu T Pham
*Assistant Examiner* — Edward X Long
(74) *Attorney, Agent, or Firm* — Crowell & Moring LLP

(57) ABSTRACT

A system for determining a vulnerability of source code includes a processor; and non-transitory computer readable media that includes instruction code that causes the processor to receive source code and a selection of one or more code analyzers for detecting vulnerability issues in the source code. The processor executes the one or more code analyzer to generate initial vulnerability data. The initial vulnerability data specifies one or more vulnerable code sections in the source code. The processor communicates the initial vulnerability data to a vulnerability analyzing engine. The vulnerability analyzing engine is configured to identify one or more code sections of the one or more code sections of the initial vulnerability data that correspond to false positives. The vulnerability analyzing engine removes the one or more code sections that correspond to false positives from the initial vulnerability data to generate second vulnerability data; and generates a report that specifies the second vulnerability data.

14 Claims, 9 Drawing Sheets

(56) References Cited

U.S. PATENT DOCUMENTS

| | | |
|---|---|---|
| 2010/0050154 A1* | 2/2010 | Balasubramanian ..... G06F 8/33 717/113 |
| 2013/0145215 A1 | 6/2013 | Pistoia et al. |
| 2014/0013304 A1* | 1/2014 | Vangala .................... G06F 8/75 717/123 |
| 2015/0121532 A1 | 4/2015 | Barel |
| 2017/0169228 A1 | 6/2017 | Brucker et al. |
| 2018/0046934 A1* | 2/2018 | Aravkin ................ G06N 20/00 |
| 2018/0275970 A1* | 9/2018 | Woulfe ................ G06N 3/0445 |
| 2018/0367561 A1* | 12/2018 | Givental ................ G06N 20/00 |

OTHER PUBLICATIONS

Scandariato et al., Predicting Vulnerable Software Components via Text Mining, 2014, IEEE Transactions on Software Engineering, vol. 40, No. 10, 993-1006 (Year: 2014).*

Extended European Search Report for European application No. 18183195.9, dated Nov. 6, 2018, pp. 1-8.

Examination Report for corresponding European application No. 18183195.9 dated Apr. 2, 2020, 5 pages.

First Examination Report issued on Indian application 201741025111 dated Aug. 19, 2020, 6 pages.

European Office Action for European application 18183195.9, dated Nov. 19, 2020, 5 pages.

* cited by examiner

Exemplary False Positive Database Records

| Category | Code Line | Comment | Line Number | Occurrences |
|---|---|---|---|---|
| Weak Credentials | this.passwordChangedDate = passwordChangedDate; | passwordChangedDate is used and hence it is not an issue. | 470 | 1 |
| Weak Credentials | this.passwordExpiryDate = passwordExpiryDate; | passwordExpiryDate is used and hence it is not an issue. | 476 | 1 |
| Potentially Logging Sensitive Information | logger.info("query passed"); | No sensitive information is logged. | 396 | 1 |
| Potentially Logging Sensitive Information | logger.info("query passed with uid"); | No sensitive information is logged. | 356 | 1 |
| Cross Site Scripting | System.out.println("SeedingUDID object in CleansingDAO="" | No user input is used and hence it is not an issue. | 265 | 1 |
| Cross Site Scripting | System.out.println("dup report list size = " | No user input is used and hence it is not an issue. | 123 | 1 |
| Cross Site Scripting | System.out.println("COUNT DAO time = " | No user input is used and hence it is not an issue. | 987 | 1 |
| Cross Site Scripting | // System.out.println("**********"+departmentList.size()); | The line is already commented and hence it is not an issue. | 671 | 1 |
| Cross Site Scripting | System.out.println("Scheme : Size" | No user input is used and hence it is not an issue. | 462 | 1 |
| Cross Site Scripting | System.out.println("Scheme : Size" | No user input is used and hence it is not an issue. | 286 | 1 |

Fig. 4

Exemplary Code pattern database records

| Category | Vulnerable Code Pattern | Vulnerable Code | Replacement Code | Replacement Code Pattern |
|---|---|---|---|---|
| SQL Injection | delete\s.*from\s.*\sw here\s.*\+ | String query="delete from question where q_id="+qid; | PreparedStatement st = connection.prepareStatement("DELETE FROM question WHERE q_id = ?"); st.setString(1); | PreparedStatement\s*st\s*|=\s*connection\.prepareStatement\(\ ".*DELETE\s*FROM\s*.*WHERE\s*q\s*id\s*|=\s*?\"\)\;\hst\.setStri ng\(1\)\;\ |
| Cross Site Scripting | .*\|<%\s*|= | <input type="text" name="t3" value="<%= username %>" size=20 maxlength=20></td> | <input type="text" name="t3" value="<c:out value="${ username }" />" size=20 maxlength=20></td> | \<c\.out\s*value\s*|=\ "\$\{username\}\"\/\> \" |
| Poor Logging Practice | System\.out\.println | System.out.println("A NS IS " + k); | log.info("ANS IS " + k); | log\.info\(\"ANS\s|s\s\ "\s\+\sk\)\;\ |
| Poor Logging Practice | System\.out\.err | System.out.err("ANS IS " + k); | log.error("ANS IS " + k); | log\.error\(\"ANS\s|s\s \"\s\+\sk\)\;\ |

Fig. 7

SYSTEM AND METHOD FOR LOCATING AND CORRECTING VULNERABILITIES IN A TARGET COMPUTER SYSTEM

RELATED APPLICATION

This application claims the benefit of priority to Indian Application No. 201741025111, filed Jul. 14, 2017, the contents of which are hereby incorporated by reference in their entirety.

BACKGROUND

Field

This application generally relates to the implementation of large computer systems. In particular, this application describes a system for locating and correcting vulnerabilities in a target computer system.

Description of Related Art

Computer systems may execute any number of applications at a given time. The applications may have been developed at different times, by different developers and using different coding practices. Over time, vulnerabilities in the applications may become apparent thus necessitating revisions to the applications.

During the development process, quality control analysts may review the source code of an application to locate code that may lead to vulnerabilities. This can be an arduous task because the source code may have millions of lines of code.

Moreover, development of the application may require a large number of iterations necessitating multiple iterations of review by quality control analysts. Thus, the analysts may end up having to review code sections for which vulnerability determinations have already been made, which is inefficient.

This inefficiency may result in vulnerabilities being missed. When these vulnerabilities eventually manifest themselves, the computer system may need to be taken offline and backup computer systems may be tasked with taking up the slack. This in turn may result in overworked computers and generally poor performance.

BRIEF SUMMARY

In one aspect, a system for determining a vulnerability of source code includes a processor; and non-transitory computer readable media that includes instruction code that causes the processor to receive source code and a selection of one or more code analyzers for detecting vulnerability issues in the source code. The processor executes the one or more code analyzer to generate initial vulnerability data. The initial vulnerability data specifies one or more vulnerable code sections in the source code. The processor communicates the initial vulnerability data to a vulnerability analyzing engine. The vulnerability analyzing engine is configured to identify one or more code sections of the one or more code sections of the initial vulnerability data that correspond to false positives. The vulnerability analyzing engine removes the one or more code sections that correspond to false positives from the initial vulnerability data to generate second vulnerability data; and generates a report that specifies the second vulnerability data.

In a second aspect, a non-transitory computer readable medium includes instruction code that facilitates determining a vulnerability of source code. The instruction code is executable by a machine for causing the machine to perform acts that include receiving source code and a selection of one or more code analyzers for detecting vulnerability issues in the source code; executing the one or more code analyzer to generate initial vulnerability data, the initial vulnerability data specifying one or more vulnerable code sections in the source code; communicating the initial vulnerability data to a vulnerability analyzing engine, the vulnerability analyzing engine being configured to identify one or more code sections of the one or more code sections of the initial vulnerability data that correspond to false positives; removing the one or more code sections that correspond to false positives from the initial vulnerability data to generate second vulnerability data; and generating a report that specifies the second vulnerability data.

In a third aspect, a method for determining a vulnerability of source code is provided. The method includes receiving source code and a selection of one or more code analyzers for detecting vulnerability issues in the source code. The one or more code analyzer are executed to generate initial vulnerability data. The initial vulnerability data specifies one or more vulnerable code sections in the source code. The initial vulnerability data is communicated to a vulnerability analyzing engine. The vulnerability analyzing engine is configured to identify one or more code sections of the one or more code sections of the initial vulnerability data that correspond to false positives. The one or more code sections that correspond to false positives are removed from the initial vulnerability data to generate second vulnerability data. A report that specifies the second vulnerability data is generated.

BRIEF DESCRIPTION OF THE DRAWINGS

FIG. 4 illustrates exemplary false positive records that may be stored in a false positives database of the environment;

FIG. 7 illustrates exemplary code pattern records that may be stored in a code pattern database of the environment;

DETAILED DESCRIPTION

The embodiments described below overcome the problems described in the background by providing a system that implements machine learning techniques to streamline the application development process. Generally, the system scans source code of a project for vulnerabilities using various plug-ins. As used herein vulnerabilities and vulnerable code sections correspond to one or more lines of code in the source code that do not conform to best coding practices. For example, the code in the code section may be written in such a way as to allow hackers to gain access to a system. The code in the code section may log information in an incorrect manner. Etc.

A machine learning processor of the system analyzes the vulnerabilities to determine whether any of the vulnerabilities are false positives, meaning that they are not in fact vulnerabilities. A report of any remaining vulnerabilities is communicated to an analyst who subsequently provides feedback regarding the vulnerabilities. The feedback is used to train the machine learning processor to detect false positives in the source code of subsequent development iterations. If the feedback given for the report is false, then the training is communicated back to the training dataset. This in turn reduces the probability of occurrence of a similar prediction. As the feedback grows, the training data set increases and more accurate results can be achieved. Similar benefits are realized when positive feedback is provided.

A second machine learning processor locates vulnerable code sections in the source code and replaces the code sections with healed code. A developer may review the changes and revise the changes if necessary. The revisions made by the developer may be utilized to train the second machine learning processor to make better code replacement decisions in future iterations.

The aspects noted above advantageously reduce the number of vulnerabilities in a computer system. This reduction results in less downtime of the system for fixing the vulnerabilities, which improves overall performance of the system. In addition, the overall dependency on any CPUs of the computer system is reduce while the system is running.

Figure 1:
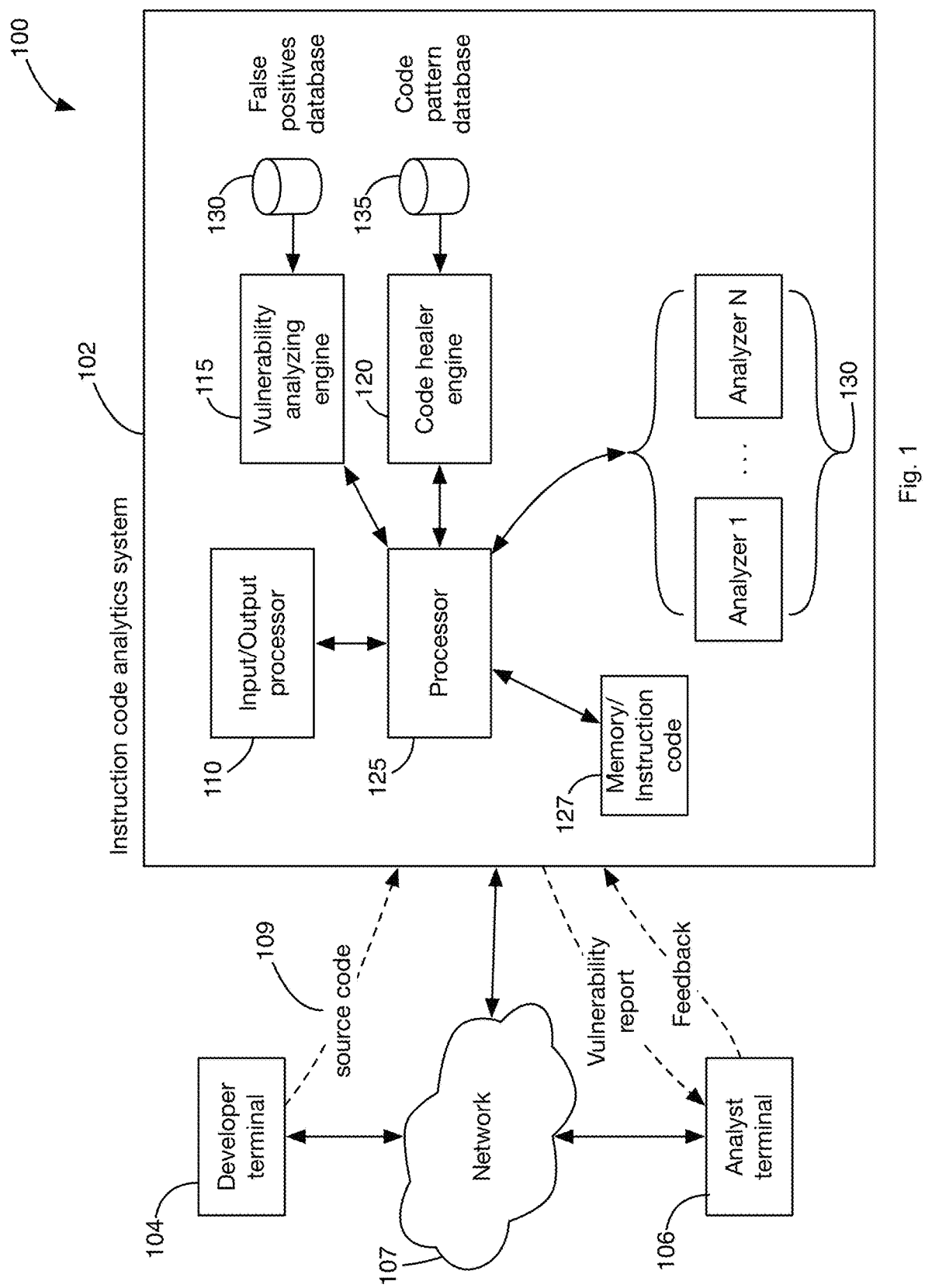
FIG. 1 illustrates an exemplary environment that includes various entities that facilitate determining the vulnerability of source code.

FIG. 1 illustrates an exemplary environment 100 that includes various entities that facilitate determining vulnerable code sections of source code 109. Entities of the environment include an instruction code analytics system (ICAS) 102, an analyst terminal 104, and a developer terminal 104. The ICAS 102, analyst terminal 104, and developer terminal 104 may communicate with one another via a network 107, such as the Internet.

The ICAS 102 includes various subsystems that facilitate determining the vulnerability of source code 109 such as an input/output processor 110, a vulnerability analyzing engine (VAE) 115, and a code healer engine (CHE) 120. The ICAS 102 includes a processor 125 that executes instruction code stored in a memory device 127 for coordinating activities performed between the various subsystems. The ICAS 102 may include other subsystems.

It is contemplated that each subsystem may correspond to a stand-alone computer system such as an Intel®, AMD®, or PowerPC® based computer system or a different computer system. The computer systems may include an operating system, such as a Microsoft Windows®, Linux, Unix® or other operating system. It is also contemplated that operations performed on the various subsystems may be combined into a fewer or greater number of subsystems to facilitate speed scaling of the ICAS 102, cost reductions, etc.

Figure 2:
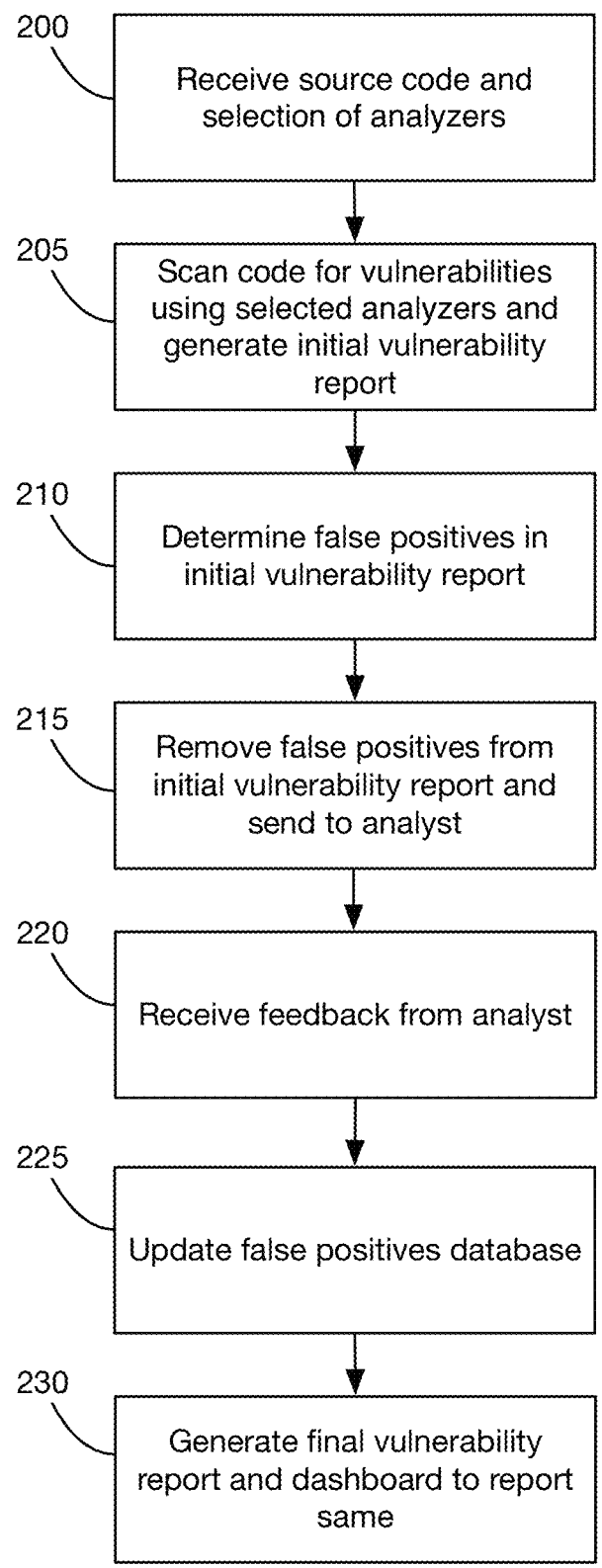
FIG. 2 illustrates operations performed by various entities of the environment in determining vulnerabilities of the source code.
Figure 6:
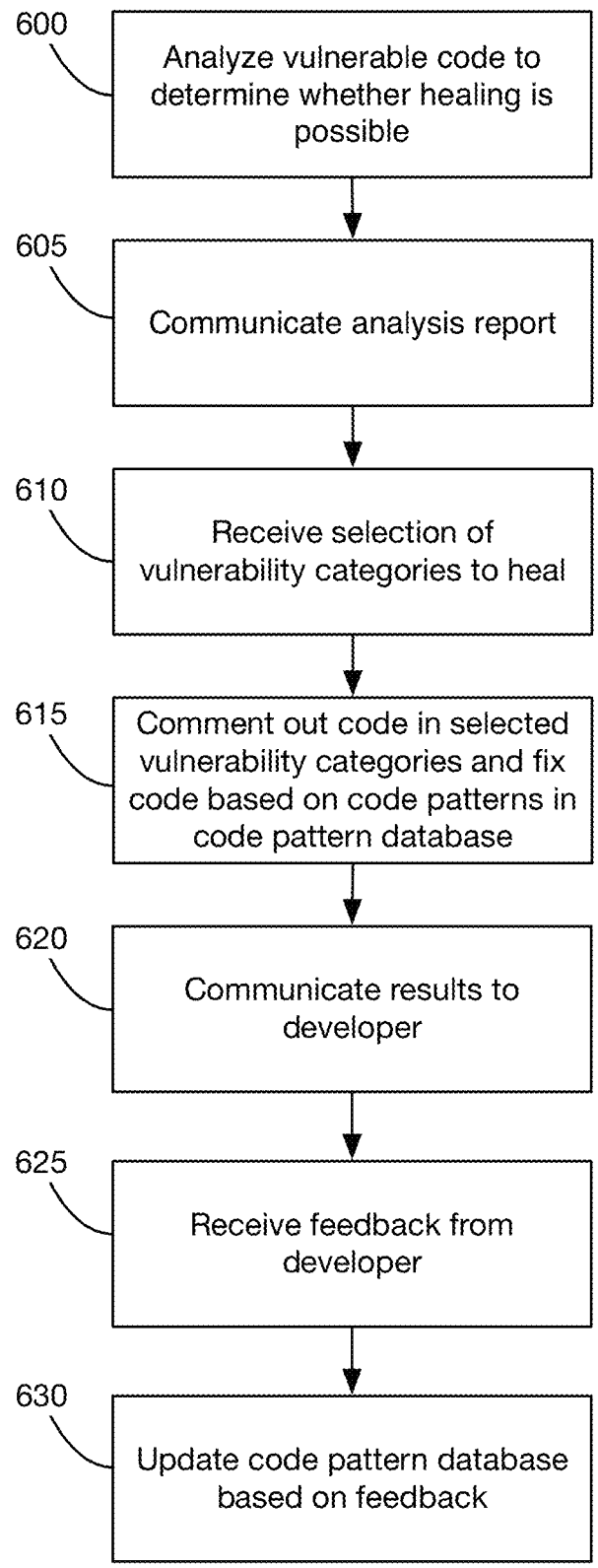
FIG. 6 illustrates exemplary operations that may be performed by various entities of the environment for mitigating the vulnerabilities in the source code.

Operations performed by one or more of the subsystems of the ICAS 102 are illustrated in FIGS. 2 and 6. In this regard, the operations may be implemented via instruction code stored in non-transitory computer readable media that resides within the subsystems configured to cause the respective subsystems to perform the operations in the figures.

At block 200, the ICAS 102 may receive data that defines source code 109 and a selection of one or more code analyzers 130 for determining whether the source code 109 includes any vulnerable code sections. In this regard, the I/O processor 110 of the ICAS 102 may generate one or more user interfaces that facilitate specifying one or more source code files on, for example, the developer terminal 104. For example, the I/O processor 110 may implement a web server that communicates web pages to the developer terminal 104.

Figure 3:
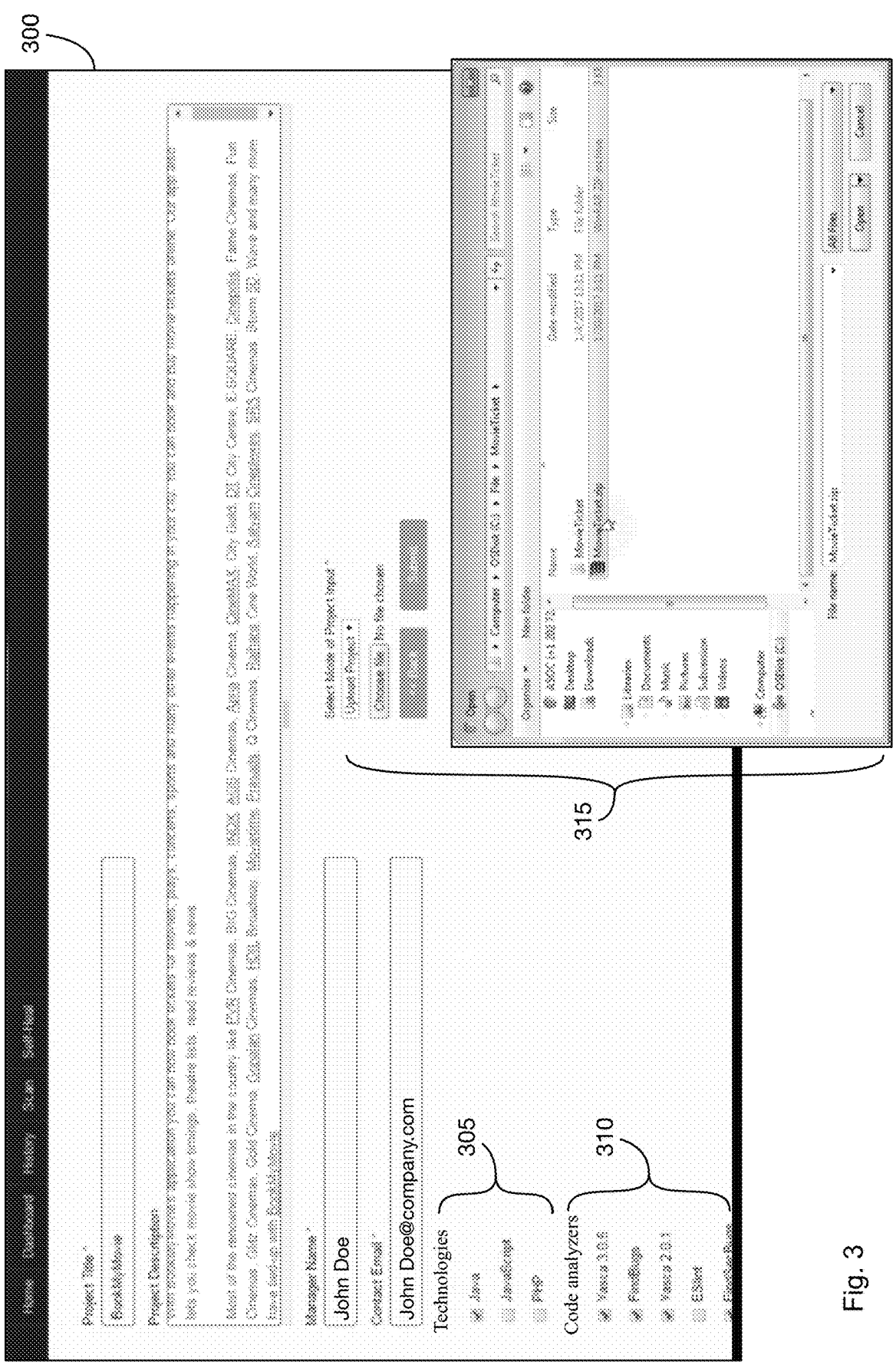
FIG. 3 illustrates a first exemplary interface that may be generated by an input/output processor of the environment.

FIG. 3 illustrates an exemplary interface 300 that may be generated by the I/O processor 110. The exemplary interface 300 may include fields for specifying project information such as a project title, a manager name, and a contact email associated with the person entering the information. The interface 300 may include technology selection fields 305 for selecting one or more technologies associated with the project information, and code analyzer selection fields 310 for selecting one or more code analyzers 130 for determining whether any source code 109 files of the project include any vulnerable code sections. The interface 300 may also include file selection controls 315 for selecting source code files of the project to be analyzed. Other fields for specifying different information may be provided.

The technology selection fields 305 facilitate selecting the type of source code to be analyzed. For example, a given project may include source code written in Java, JaveScript, PHP, C, C++, etc. The technology selection fields 305 facilitate selecting the types of files within the project for which analysis is desired. In the exemplary interface 300, Java files are selected for analysis.

The code analyzer selection fields 310 facilitate selecting different code analyzers 130 for determining vulnerable code sections in the specified source code of the project. For example, the code analyzer selection fields 310 may facilitate selecting code analyzers 130 such as Yasca 3.0.5, FindBugs, Yasca 2.0.1, ESlint, etc.

The code analyzers 130 generally correspond to software plug-ins written by third parties. Each code analyzer is tailored to find different types of vulnerability issues. For example, Yasca is an open source program that looks for security vulnerabilities, code-quality issues, performance issues, and conformance to best practices issues in program source code. FindBugs is an open source static code analyzer that detects possible bugs in Java programs and classifies the bugs into one of four categories depending on severity. ESLint is an open source JavaScript linting utility that finds problematic patterns or code that doesn't adhere to certain style guidelines.

At block 205, the processor 125 may execute instruction code to cause the selected code analyzers 130 to search for vulnerabilities in the source code 109. For example, the processor may cause the plugins Yasca 3.0.5, FindBugs, and Yasca 2.0.1 to search for vulnerabilities in the source code 109. Each code analyzers 130 may generate a report indicating various vulnerability issues found with the source code. For example, a code section from an analyzed file along with the vulnerability issue associated with the code section may be specified in the report. The processor 125 may aggregate the reports generated by the code analyzers 130 into an initial vulnerability report. Thus, the initial vulnerability report may list any number of vulnerability code sections along with an indication of the corresponding vulnerability.

At block 210, false positives in the initial vulnerability report may be determined by the vulnerability analyzing engine 115. False positives generally correspond to non-issues or issues identified in the vulnerability report that were previously determined to be non-problematic. To facilitate determination of the false positives, the vulnerability analyzing engine 115 may implement various artificial intelligence techniques to convert the code sections in the initial vulnerability report into code patterns. For example, the vulnerability analyzing engine may utilize tokenization and part-of-speech tagging to preprocess the code sections. Text in the pre-processed code section may then be classified to extract code patterns associated with the code sections in the initial vulnerability report. In one implementation, the vulnerability analyzing engine 115 may utilize various Python machine learning scripts such as those available in the scikit-learn package to extract the code patterns.

Next, the vulnerability analyzing engine 115 may search a false positives database 130 to locate records related to the determined code pattern.

FIG. 4 illustrates exemplary records 400 in the false positives database 130. Each record relates category, code pattern, and comment fields. The category field indicates the category name of a vulnerability, such as weak credentials, logging of sensitive information, cross-site scripting, etc.

The code pattern field indicates different code patterns that are known to be vulnerable. The code patterns may correspond to one or more lines of code in the source code that were indicated as lacking integrity by one or more of the code analyzers 130. In some implementations, the code pattern may correspond generally an actual code snippet that is known to be vulnerable. In other implementations, the code pattern may be expressed in a parametrized form. For example, the code pattern may include various wildcards and/or may be expressed as a regular expression to facilitate matching the code pattern to one or more code sections in the source code.

The comment field indicates previously provided feedback related to the code pattern that is indicative of whether the code pattern is vulnerable. In this regard, the feedback may be a natural language expression provided by an analyst tasked with making these determinations. For example, the comment in the first record has the phrase "it is not an issue," which indicates that the corresponding code pattern is a false positive.

The vulnerability analyzing engine 115 may implement various natural language processing techniques to make the determination as to the meaning of the comment. For example, as described above with respect to code pattern extraction, the vulnerability analyzing engine 115 may utilize tokenization and part-of-speech tagging to preprocess the comment. Text in the pre-processed comment may then be classified to extract the meaning. Python machine learning scripts such as those available in the scikit-learn package may be utilized to extract the meaning.

In some implementations, each record includes a false positive field to store a flag associated with the determination above. For example, a "1" may be used to indicate that the corresponding comment indicates a false positive. A "0" may be used to indicate that the code pattern is not a false positive and/or that the corresponding comment indicates the same.

Other fields may specify the name and version of a source code file previously associated with the code pattern along with the line number in the source code from which the code pattern was derived. Other information such as the modification date, creation date, etc. of the source code may be specified. Inclusion of the name of the source code, line number of the code section, etc. facilitates determining whether a vulnerability determination for a given code section in source code was previously made. This advantageously facilitates automatically removing code sections from the vulnerability report for which a vulnerability determination has been made by an analyst. This in turn relieves the analyst of the burden of having to review code sections that have already been reviewed.

For each code section in the source code 109 that was indicated as being vulnerable by one or more of the code analyzers 130, the vulnerability analyzing engine 115 may convert the code section to a code pattern, as noted above, and search the false positives database 130 for a record that matches the code pattern. If a match is found, the vulnerability analyzing engine 115 utilizes the learned meaning of the comment to determine whether the code section is vulnerable or whether the indication of vulnerability by the code analyzers 130 is a false positive. Where a false positive field is provided, the determination may be made based on the value of the false positive field.

At block 215, the processor 125 may remove the false positives determined at block 210 from the initial vulnerability report. For example, any code sections in the source code that were determined by the code analyzers 130 as being vulnerable that were subsequently determined to be non-problematic may be removed from the vulnerability report. Other code sections that were previously considered by an analyst may be flagged to indicate this fact.

The vulnerability report may then be communicated to the analyst terminal 106 by the I/O processor 110. For example, the I/O processor 110 may generate an interface viewable on the analyst terminal 106 that lists the code sections along with the corresponding vulnerability. Other information such as the name of the source code file, manager and developers associated with the source code, etc. may be specified.

An analyst operating the analyst terminal 106 may then select code sections that are not flagged as already having been reviewed and review the selected code sections to determine whether the indicated vulnerability is a false positive. The analyst may provide feedback as to whether the indicated vulnerability is a false positive such as "No sensitive information is logged," "No user input is used and hence it is not an issued," etc.

At block 220, information that includes the feedback provided by the analyst and the corresponding code sections for which feedback is received may be received at the ICAS 102 and processed by the vulnerability analyzer engine 115.

At block the 225, the vulnerability analyzer engine 115 may update the false positives database 130 based on the received information. For example, the vulnerability analyzer engine 115 may insert a record in the false positives database 130. The record may include the actual code section associated with the feedback and/or a corresponding parametrized version of the code section that includes wild cards, etc., and the feedback provided by the analyst. The feedback may be subsequently analyzed by the vulnerability analyzer engine 115 to determine whether the feedback is indicative of the corresponding code section/code pattern being a false positive. Other information, such as the name and version of the source code file associated with the code section, the line number in the source code at which the code section was located, etc. may be included in the record.

Figure 5:
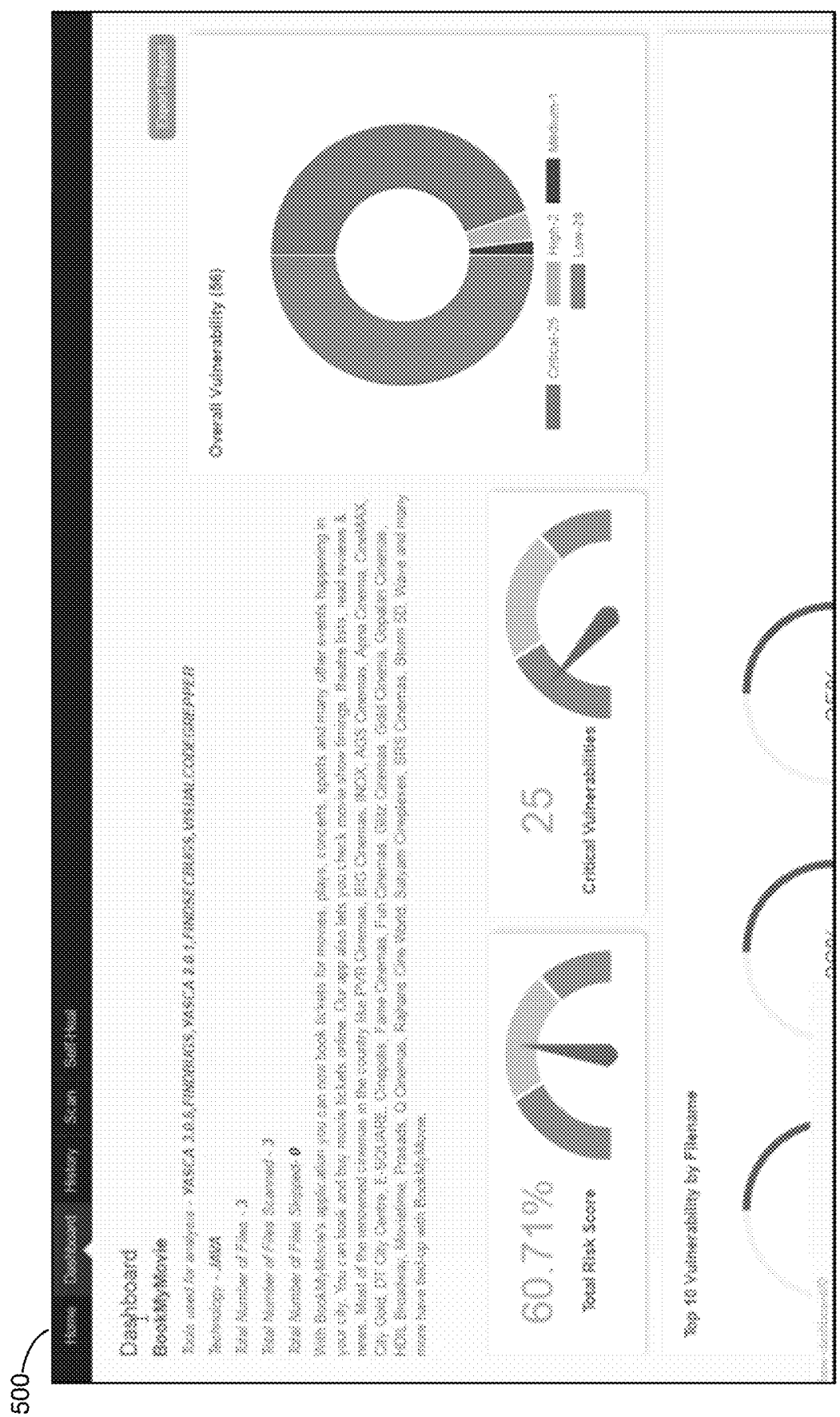
FIG. 5 illustrates an exemplary dashboard that displays information associated with a vulnerability report.

At block 230, a final vulnerability report associated with the source code may be generated. In some implementations, an interface such as the dashboard interface 500 illustrated in FIG. 5 may be generated. Referring to FIG. 5, the interface 500 may provide information such as the number of vulnerabilities found in the source code. The class of vulnerability (e.g., critical, high, medium, low) may be provided as well. Other information may include a listing of code analyzers used in generating the initial vulnerability report, the number of files analyzed, the names of the files, etc.

FIG. 6 illustrates exemplary operations that may be performed by the ICAS 102 for mitigating the vulnerabilities in source code that are specified in the vulnerability report.

At block 600, the code healer engine 120 may analyze the vulnerability report to determine whether one or more of the vulnerability issues specified in the report may be mitigated. To facilitate performing this operation, the code healer engine 120 may be coupled to a code pattern database 135 that includes records that relate various vulnerable code patterns with replacement code patterns.

FIG. 7 illustrates exemplary code pattern records 700 that may be stored in the code pattern database 135. Each record relates category, vulnerable code, vulnerable code pattern, replacement code, and replacement code pattern fields. The category field indicates a type of vulnerable code such as SQL injection, cross-site scripting, poor logging practice, etc.

The vulnerable code field specifies actual vulnerable code and the vulnerable code pattern field specifies a parameterized version of the actual vulnerable code. The vulnerable code pattern may include wildcards, regular expressions and the like to facilitate matching to vulnerable code that meets the matching criteria.

The replacement code field specifies actual replacement code and the replacement code pattern field specifies a parameterized version of the actual replacement code. The replacement code pattern may include wildcards, regular expressions and the like to facilitate converting vulnerable code that matches a vulnerable code pattern to healed code. For example, the parametrized portions of the replacement code may be replaced with the corresponding parameters of the vulnerable code pattern.

In operation, the code healer engine 120 searches through the code pattern database 135 for vulnerable code and/or vulnerable code patterns that match code sections reported in the vulnerability report. When a match is found, the code healer engine 120 determines that at least some of the issues noted in the vulnerability reported may be mitigated.

At block 605, the ICAS 102 may communicate the results of the analysis to the developer terminal 104. For example, a web page with the results may be generated by the I/O processor 110 and communicated to the developer terminal 104. The results may display code snippets, line numbers, etc. that allow the developer to determine which portions of the source code 109 may be healed. The web page may be configured to facilitate selecting the types of integrity issues to heal. For example, the developer may choose to correct critical, high, medium, and/or low priority vulnerabilities.

At block 610, the ICAS 102 may receive a selection of the vulnerability categories to heal.

At block 615, the code healer engine 120 may proceed to heal the source code 109. For example, the code healer engine 120 may generate a backup copy of the source code 109. Next, for each code section in the vulnerability report that a) matches the vulnerability category selected by the developer and b) can be healed, the code healer engine 120 searches through the code pattern database 135 for a record that includes vulnerable code and/or vulnerable code patterns that match the code section. If a match is found, the code healer engine 120 comments the corresponding code section in the original source code, and inserts the corresponding replacement code or replacement code generated according to the replacement code pattern below the commented code section.

Figure 8:
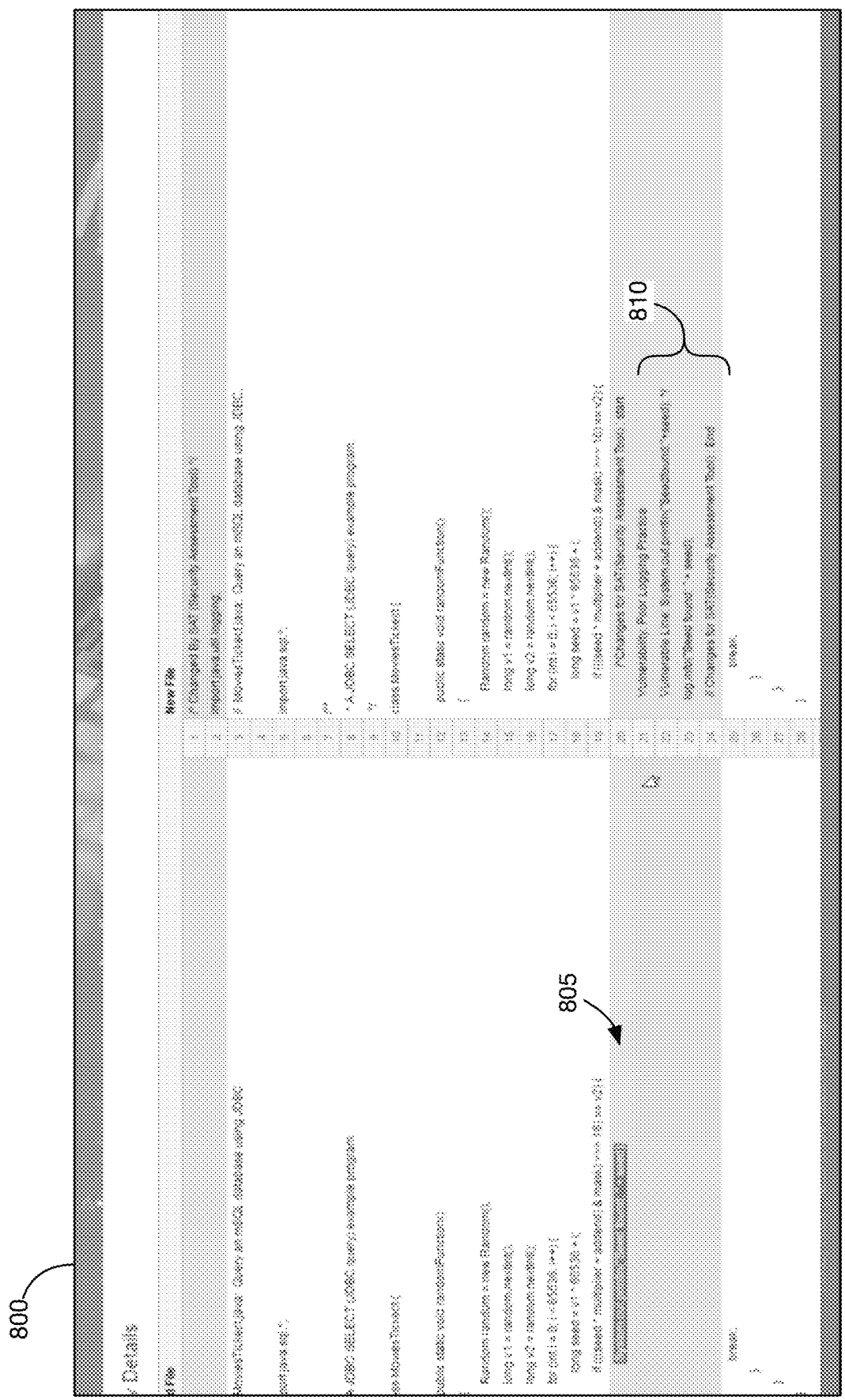
FIG. 8 illustrates an interface that facilitates side-by-side comparison of original source code with healed source code.

At block 620, the ICAS 102 may communicate an interface 800 to the developer terminal 104 to facilitate side-by-side comparison of the original source code with the version of the source code, as illustrated in FIG. 8. For example, the left side of the interface may display the original source code 805. The right side of the interface may display the modified source code in which the problematic code section 810 is commented and the replacement code is inserted below the commented code section.

At block 625, feedback regarding the changes in the modified source code may be received from the developer terminal 104. For example, a developer may determine that the changes in the modified source code 805 will not be adequate. In this case, the developer may undo the modifications and insert different code.

At block 630, the changes made by the developer may be communicated to the code healer engine 120. The code healer engine 120 may add or modify a record in the code pattern database 135 that corresponds to the problematic code section for which feedback was received. The code healer engine 120 may then insert the replacement code specified in the feedback into the record and/or convert the replacement code specified in the feedback into a parameterized version of the replacement code and insert the parameterized version in the record. In this way, the code healing capabilities of the ICAS 102 may be updated over-time, thus improving the accuracy of the replacements with usage.

Figure 9:
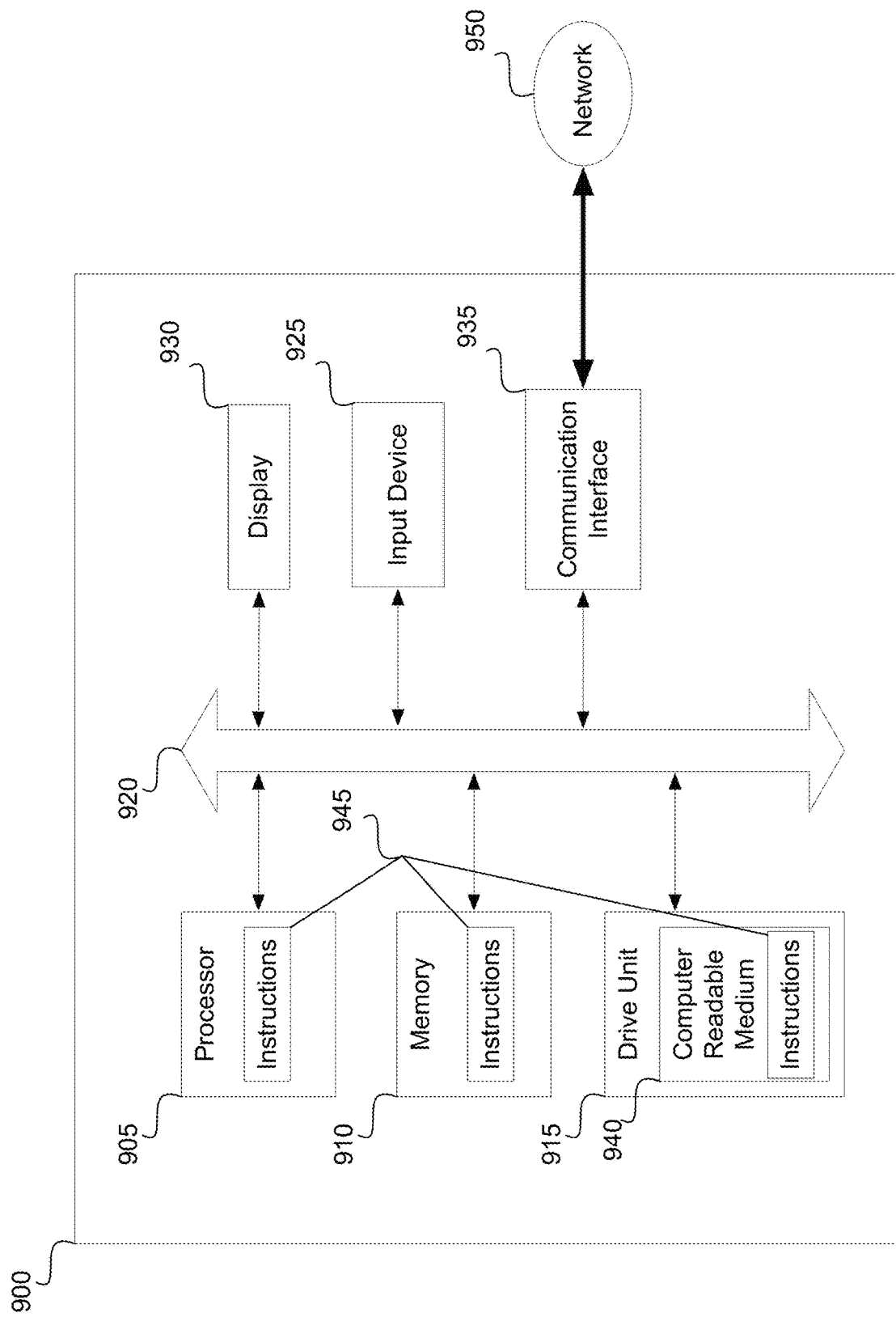
FIG. 9 illustrates an exemplary computer system that may form part of or implement the systems described in the figures or in the following paragraphs.

FIG. 9 illustrates a computer system 900 that may form part of or implement the systems described above. The computer system 900 may include a set of instructions 945 that the processor 905 may execute to cause the computer system 900 to perform any of the operations described above. The computer system 900 may operate as a stand-alone device or may be connected, e.g., using a network, to other computer systems or peripheral devices.

In a networked deployment, the computer system 900 may operate in the capacity of a server or as a client-user computer in a server-client user network environment, or as a peer computer system in a peer-to-peer (or distributed) network environment. The computer system 900 may also be implemented as or incorporated into various devices, such as a personal computer or a mobile device, capable of executing the instructions 945 (sequential or otherwise) that specify actions to be taken by that machine. Further, each of the systems described may include any collection of sub-systems that individually or jointly execute a set, or multiple sets, of instructions to perform one or more computer functions.

The computer system 900 may include one or more memory devices 910 on a bus 920 for communicating information. In addition, code operable to cause the computer system to perform any of the operations described above may be stored in the memory 910. The memory 910 may be a random-access memory, read-only memory, programmable memory, hard disk drive or any other type of memory or storage device.

The computer system 900 may include a display 930, such as a liquid crystal display (LCD), a cathode ray tube (CRT), or any other display suitable for conveying information. The display 930 may act as an interface for the user to see the functioning of the processor 905, or specifically as an interface with the software stored in the memory 910 or in the drive unit 915.

Additionally, the computer system 900 may include an input device 925, such as a keyboard or mouse, configured to allow a user to interact with any of the components of system 900.

The computer system 900 may also include a disk or optical drive unit 915. The disk drive unit 915 may include a computer-readable medium 940 in which the instructions 945 may be stored. The instructions 945 may reside completely, or at least partially, within the memory 910 and/or within the processor 905 during execution by the computer system 900. The memory 910 and the processor 905 also may include computer-readable media as discussed above.

The computer system 900 may include a communication interface 935 to support communications via a network 950. The network 950 may include wired networks, wireless networks, or combinations thereof. The communication interface 935 network may enable communications via any number of communication standards, such as 802.11, 802.12, 802.20, WiMAX, cellular telephone standards, or other communication standards.

Accordingly, the method and system may be realized in hardware, software, or a combination of hardware and software. The method and system may be realized in a centralized fashion in at least one computer system or in a distributed fashion where different elements are spread across several interconnected computer systems. Any kind of computer system or other apparatus adapted for carrying out the methods described herein may be employed.

The method and system may also be embedded in a computer program product, which includes all the features enabling the implementation of the operations described herein and which, when loaded in a computer system, is able to carry out these operations. Computer program in the present context means any expression, in any language, code or notation, of a set of instructions intended to cause a system having an information processing capability to perform a particular function, either directly or after either or both of the following: a) conversion to another language, code or notation; b) reproduction in a different material form.

While methods and systems have been described with reference to certain embodiments, it will be understood by those skilled in the art that various changes may be made and equivalents may be substituted without departing from the scope of the claims. Therefore, it is intended that the present methods and systems not be limited to the particular embodiment disclosed, but that the disclosed methods and systems include all embodiments falling within the scope of the appended claims.

We claim:

1. A system for determining a vulnerability of source code, the system comprising:
a processor; and
non-transitory computer readable media that includes instruction code that causes the processor to:
receive source code and a selection of one or more code analyzers for detecting vulnerability issues in the source code;
execute the one or more code analyzers to generate initial vulnerability data, the initial vulnerability data specifying one or more vulnerable code sections in the source code;
communicate the initial vulnerability data to a vulnerability analyzing engine, the vulnerability analyzing engine being configured to identify one or more code sections of the one or more code sections of the initial vulnerability data that correspond to false positives by utilizing tokenization and part-of-speech tagging to preprocess the identified code sections and classifying texts in the preprocessed code sections to extract code patterns associated with the identified code sections, wherein the code patterns include wildcards and correspond to parametrized versions of vulnerable code sections;
execute the vulnerability analyzing engine to locate records associated with the code patterns from a false positives database, the records including a category section, a code pattern section, and a comment field section, wherein the category section represents a vulnerability category including weak credentials, logging of sensitive information, and cross-site scripting, wherein the code pattern section represents different code patterns that are vulnerable, and wherein the comment field section represents feedback previously provided by an analyst terminal in a natural language expression associated with the code patterns;
automatically remove the one or more code sections that correspond to false positives from the initial vulnerability data to generate second vulnerability data based on the located records including a name of the source code previously associated with the code patterns and a line number in the source code from which the code patterns were derived; and
generate a report that specifies the second vulnerability data.

2. The system according to claim 1, wherein the instruction code causes the processor to:
communicate the initial vulnerability data to an analyst terminal;
receive feedback from the analyst terminal associated with a code section in the initial vulnerability data;
generate a code pattern of a plurality of code patterns associated with the code section;
add a record to the false positives database that relates the code pattern and the feedback from the analyst terminal;
wherein the vulnerability analyzing engine includes a natural language processor configured to process the feedback to determine whether the feedback indicates that the related code pattern corresponds to a false positive.

3. The system according to claim 1, wherein the non-transitory computer readable media causes the processor to:
communicate the second vulnerability data to a code healer engine that is coupled to a code pattern database that includes records that relate vulnerable code patterns with replacement code patterns, wherein for each code section in the second vulnerability data, the code healer engine is configured to:
determine whether a vulnerable code pattern associated with the code section exists in the code pattern database;
generate a commented version of the code section;
generate replacement code based on the replacement code pattern in the code pattern database; and
communicate the commented version of the code section and the replacement code to a developer terminal.

4. The system according to claim 3, wherein vulnerable code patterns and the replacement code patterns are parametrized to facilitate copying portions of vulnerable code sections into the replacement code.

5. The system according to claim 3, wherein the instruction code causes the processor to:

receive feedback from the developer terminal associated with the replacement code, the feedback defining different replacement code for replacing the code section;

communicate the feedback to the code healer engine, wherein the code healer engine is configured to:

generate a code pattern of a plurality of code patterns associated with the different replacement code; and add a record to the code pattern database that relates the code pattern associated with the different replacement code with the code section being replaced, wherein the code healer engine includes a natural language processor configured to convert the different replacement code to the code pattern associated with the different replacement code.

6. A non-transitory computer readable medium that includes instruction code that facilitates determining a vulnerability of source code, the instruction code being executable by a machine for causing the machine to perform acts comprising:

receiving source code and a selection of one or more code analyzers for detecting vulnerability issues in the source code;

executing the one or more code analyzers to generate initial vulnerability data, the initial vulnerability data specifying one or more vulnerable code sections in the source code;

communicating the initial vulnerability data to a vulnerability analyzing engine, the vulnerability analyzing engine being configured to identify one or more code sections of the one or more code sections of the initial vulnerability data that correspond to false positives by utilizing tokenization and part-of-speech tagging to preprocess the identified code sections and classifying texts in the preprocessed code sections to extract code patterns associated with the identified code sections, wherein the code patterns include wildcards and correspond to parametrized versions of vulnerable code sections;

executing the vulnerability analyzing engine to locate records associated with the code patterns from a false positives database, the records including a category section, a code pattern section, and a comment field section, wherein the category section represents a vulnerability category including weak credentials, logging of sensitive information, and cross-site scripting, wherein the code pattern section represents different code patterns that are vulnerable, and wherein the comment field section represents feedback previously provided by an analyst terminal in a natural language expression associated with the code patterns;

automatically removing the one or more code sections that correspond to false positives from the initial vulnerability data to generate second vulnerability data based on the located records including a name of the source code previously associated with the code patterns and a line number in the source code from which the code patterns were derived; and generating a report that specifies the second vulnerability data.

7. The non-transitory computer readable medium according to claim 6, wherein the instruction code causes the machine to perform acts comprising:

communicating the initial vulnerability data to an analyst terminal;

receiving feedback from the analyst terminal associated with a code section in the initial vulnerability data;

generating a code pattern of a plurality of code patterns associated with the code section;

adding a record to the false positives database that relates the code pattern and the feedback from the analyst terminal;

wherein the vulnerability analyzing engine includes a natural language processor configured to process the feedback to determine whether the feedback indicates that the related code pattern corresponds to a false positive.

8. The non-transitory computer readable medium according to claim 6, wherein the non-transitory computer readable media causes the machine to perform acts comprising:

communicating the second vulnerability data to a code healer engine that is coupled to a code pattern database that includes records that relate vulnerable code patterns with replacement code patterns, wherein for each code section in the second vulnerability data, the code healer engine is configured to:

determining whether a vulnerable code pattern associated with the code section exists in the code pattern database;

generating a commented version of the code section;

generating replacement code based on the replacement code pattern in the code pattern database; and communicating the commented version of the code section and the replacement code to a developer terminal.

9. The non-transitory computer readable medium according to claim 8, wherein vulnerable code patterns and the replacement code patterns are parametrized to facilitate copying portions of vulnerable code sections into the replacement code.

10. The non-transitory computer readable medium according to claim 8, wherein the instruction code causes the machine to perform acts comprising:

receiving feedback from the developer terminal associated with the replacement code, the feedback defining different replacement code for replacing the code section;

communicating the feedback to the code healer engine, wherein the code healer engine is configured to:

generate a code pattern of a plurality of code patterns associated with the different replacement code; and add a record to the code pattern database that relates the code pattern associated with the different replacement code with the code section being replaced, wherein the code healer engine includes a natural language processor configured to convert the different replacement code to the code pattern associated with the different replacement code.

11. A method for determining a vulnerability of source code, the method comprising:

receiving source code and a selection of one or more code analyzers for detecting vulnerability issues in the source code;

executing the one or more code analyzers to generate initial vulnerability data, the initial vulnerability data specifying one or more vulnerable code sections in the source code;

communicating the initial vulnerability data to a vulnerability analyzing engine, the vulnerability analyzing engine being configured to identify one or more code sections of the one or more code sections of the initial vulnerability data that correspond to false positives by utilizing tokenization and part-of-speech tagging to preprocess the identified code sections and classifying texts in the preprocessed code sections to extract code patterns associated with the identified code sections, wherein the code patterns include wildcards and correspond to parametrized versions of vulnerable code sections;

executing the vulnerability analyzing engine to locate records associated with the code patterns from a false positives database, the records including a category section, a code pattern section, and a comment field section, wherein the category section represents a vulnerability category including weak credentials, logging of sensitive information, and cross-site scripting, wherein the code pattern section represents different code patterns that are vulnerable, and wherein the comment field section represents feedback previously provided by an analyst terminal in a natural language expression associated with the code patterns;

automatically removing the one or more code sections that correspond to false positives from the initial vulnerability data to generate second vulnerability data based on the located records including a name of the source code previously associated with the code patterns and a line number in the source code from which the code patterns were derived; and generating a report that specifies the second vulnerability data.

12. The method according to claim 11, further comprising:

communicating the initial vulnerability data to an analyst terminal;

receiving feedback from the analyst terminal associated with a code section in the initial vulnerability data;

generating a code pattern of a plurality of code patterns associated with the code section;

adding a record to the false positives database that relates the code pattern and the feedback from the analyst terminal;

wherein the vulnerability analyzing engine includes a natural language processor configured to process the feedback to determine whether the feedback indicates that the related code pattern corresponds to a false positive.

13. The method according to claim 11, further comprising:

communicating the second vulnerability data to a code healer engine that is coupled to a code pattern database that includes records that relate vulnerable code patterns with replacement code patterns, wherein for each code section in the second vulnerability data, the code healer engine is configured to:

determining whether a vulnerable code pattern associated with the code section exists in the code pattern database;

generating a commented version of the code section;

generating replacement code based on the replacement code pattern in the code pattern database; and communicating the commented version of the code section and the replacement code to a developer terminal.

14. The method according to claim 13, further comprising:

receiving feedback from the developer terminal associated with the replacement code, the feedback defining different replacement code for replacing the code section;

communicating the feedback to the code healer engine, wherein the code healer engine is configured to:

generate a code pattern of a plurality of code patterns associated with the different replacement code; and add a record to the code pattern database that relates the code pattern associated with the different replacement code with the code section being replaced, wherein the code healer engine includes a natural language processor configured to convert the different replacement code to the code pattern associated with the different replacement code.

* * * * *